United States Patent
Blakley et al.

(10) Patent No.: US 10,474,434 B1
(45) Date of Patent: Nov. 12, 2019

(54) AUTOMATION TOOL

(71) Applicant: Bank of America Corporation, Charlotte, NC (US)

(72) Inventors: Brian Alan Blakley, North Pinellas Park, FL (US); Eric Choi, Old Tappan, NJ (US); Rodney Martin Trueba, Marietta, GA (US); Vasanthan Rangan, Lexington, MA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/184,260

(22) Filed: Nov. 8, 2018

(51) Int. Cl.
| | |
|---|---|
| *G06F 9/44* | (2018.01) |
| *G06F 8/30* | (2018.01) |
| *G06F 9/48* | (2006.01) |
| *G06F 16/23* | (2019.01) |
| *G06F 21/57* | (2013.01) |

(52) U.S. Cl.
CPC .............. *G06F 8/30* (2013.01); *G06F 9/4843* (2013.01); *G06F 16/2379* (2019.01); *G06F 21/577* (2013.01); *G06F 2221/034* (2013.01)

(58) Field of Classification Search
None
See application file for complete search history.

(56) References Cited

U.S. PATENT DOCUMENTS

| | | |
|---|---|---|
| 7,962,470 B2 | 6/2011 | Degenkolb et al. |
| 8,799,319 B2 | 8/2014 | Srinivasan et al. |
| 9,141,592 B2 | 9/2015 | Baikov et al. |
| 9,280,527 B2 | 3/2016 | Baikov et al. |
| 9,395,956 B2 | 7/2016 | Maximilien |
| 9,606,778 B2 | 3/2017 | Srinivasan et al. |
| 9,699,249 B2 | 7/2017 | Hristov |
| 9,946,520 B1 | 4/2018 | Houchard et al. |
| 10,210,074 B1 * | 2/2019 | Szerenyi ............. G06F 11/3664 |
| 2018/0189168 A1 * | 7/2018 | Dwarakanath ...... G06F 11/3684 |

* cited by examiner

*Primary Examiner* — Qamrun Nahar
(74) *Attorney, Agent, or Firm* — Baker Botts L.L.P.

(57) ABSTRACT

A memory stores a first automation script and a second automation script. A hardware processor performs a first task and a second task by executing the first automation script and performs a third task and a fourth task by executing the second automation script. The processor isolates first and second portions of the first automation script that correspond to the first and second tasks and isolates third and fourth portions of the second automation script that correspond to the third and fourth tasks. The processor also generates a third automation script that includes one or more of the first portion and the second portion and one or more of the third portion and the fourth portion and executes the third automation script to perform one or more of the first task and the second task and one or more of the third task and fourth task.

17 Claims, 3 Drawing Sheets

AUTOMATION TOOL

TECHNICAL FIELD

This disclosure relates generally to automation scripting.

BACKGROUND

Computers and mobile devices increasingly use automation scripts to automate tasks. In many instances, these scripts come off-the-shelf and do not allow a user to split or break the script apart.

SUMMARY OF THE DISCLOSURE

Computers and mobile devices increasingly use automation scripts to automate tasks. For example, these devices may use automation scripts to perform logon and logoff, activating and shutting down a server, pushing and pulling data, perform security and vulnerability scans according to set schedules, etc. In some instances, these scripts can be used to simulate user activity to test the functionality of the device or system. Additionally, these scripts can be used to simulate user activity by a large user base to see how a device or system will perform under stress. Typically, these scripts are used to perform a set of tasks that may be seen as routine according to certain schedules, such as maintenance schedules.

In many instances, these scripts come off-the-shelf and do not allow a user to split or break the script apart. These types of scripts may be referred to as "closed automations" because they do not allow users to peer into the script and isolate and/or separate out the tasks performed by the script. These scripts may be programmed by third parties who do not wish for users to see or analyze the code. As a result, these closed automations pose an all-or-nothing choice to users: either perform all the tasks programmed into a particular script or perform none of them.

This all-or-nothing approach results in significant waste of system resources. For example, suppose a first script performed tasks A, B, C and D and a second script performed tasks B, C, D, and E. If a user wanted to perform tasks A, B, C, D, and E, then the user would need to execute both the first and second scripts, which results in tasks B, C, and D being redundantly performed.

In some instances, this all-or-nothing approach results in certain tasks being not performed. Using the previous example, if a user wanted to perform task A and then task E (e.g., group tasks A and E into a composite task), the user would not be able to execute the first and/or second tasks to achieve this goal because tasks B, C, and D would be performed between tasks A and E.

This disclosure contemplates an unconventional automation tool that breaks apart closed automations into individual tasks. For example, the tool may analyze the coding of scripts and adjust links or tables in files, databases, directories, and/or queues to retarget or relink various tasks in different scripts. In this manner, the tool can separate tasks in automation scripts and adjust and/or reorder tasks. The tool can create composite tasks and new scripts that perform individual tasks in different orders. As a result, the tool reduces system waste by reducing redundant performance of tasks. Additionally, the system allows certain automation scripts to be repurposed even when those automation scripts contain tasks that are not performed.

According to an embodiment, an apparatus includes a memory and a hardware processor. The memory stores a first automation script and a second automation script. The hardware processor performs a first task and a second task by executing the first automation script and performs a third task and a fourth task by executing the second automation script. The hardware processor isolates a first portion of the first automation script that corresponds to the first task, isolates a second portion of the first automation script that corresponds to the second task, isolates a third portion of the second automation script that corresponds to the third task, and isolates a fourth portion of the second automation script that corresponds to the fourth task. The hardware processor also generates a third automation script that includes one or more of the first portion and the second portion and one or more of the third portion and the fourth portion and executes the third automation script to perform one or more of the first task and the second task and one or more of the third task and fourth task.

According to another embodiment, a method includes storing, by a memory, a first automation script and a second automation script. The method also includes performing, by a hardware processor communicatively coupled to the memory, a first task and a second task by executing the first automation script and performing, by the hardware processor, a third task and a fourth task by executing the second automation script. The method further includes isolating, by the hardware processor, a first portion of the first automation script that corresponds to the first task, isolating, by the hardware processor, a second portion of the first automation script that corresponds to the second task, isolating, by the hardware processor, a third portion of the second automation script that corresponds to the third task, and isolating, by the hardware processor, a fourth portion of the second automation script that corresponds to the fourth task. The method also includes generating, by the hardware processor, a third automation script that includes one or more of the first portion and the second portion and one or more of the third portion and the fourth portion and executing, by the hardware processor, the third automation script to perform one or more of the first task and the second task and one or more of the third task and fourth task.

According to yet another embodiment, a system includes a database and an automation tool. The automation tool stores a first automation script and a second automation script. The automation tool also performs a first task and a second task by executing the first automation script, the first task linked to the second task in the database and performs a third task and a fourth task by executing the second automation script, the third task and the fourth task linked in the database. The automation tool further isolates a first portion of the first automation script that corresponds to the first task, isolates a second portion of the first automation script that corresponds to the second task, isolates a third portion of the second automation script that corresponds to the third task, and isolates a fourth portion of the second automation script that corresponds to the fourth task. The automation tool also generates a third automation script that includes one or more of the first portion and the second portion and one or more of the third portion and the fourth portion and executes the third automation script to perform one or more of the first task and the second task and one or more of the third task and fourth task.

Certain embodiments provide one or more technical advantages. For example, an embodiment reduces system resource waste by reducing the number of redundant task executions. As another example, an embodiment allows certain automation scripts to be used even though the scripts contain undesired tasks. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
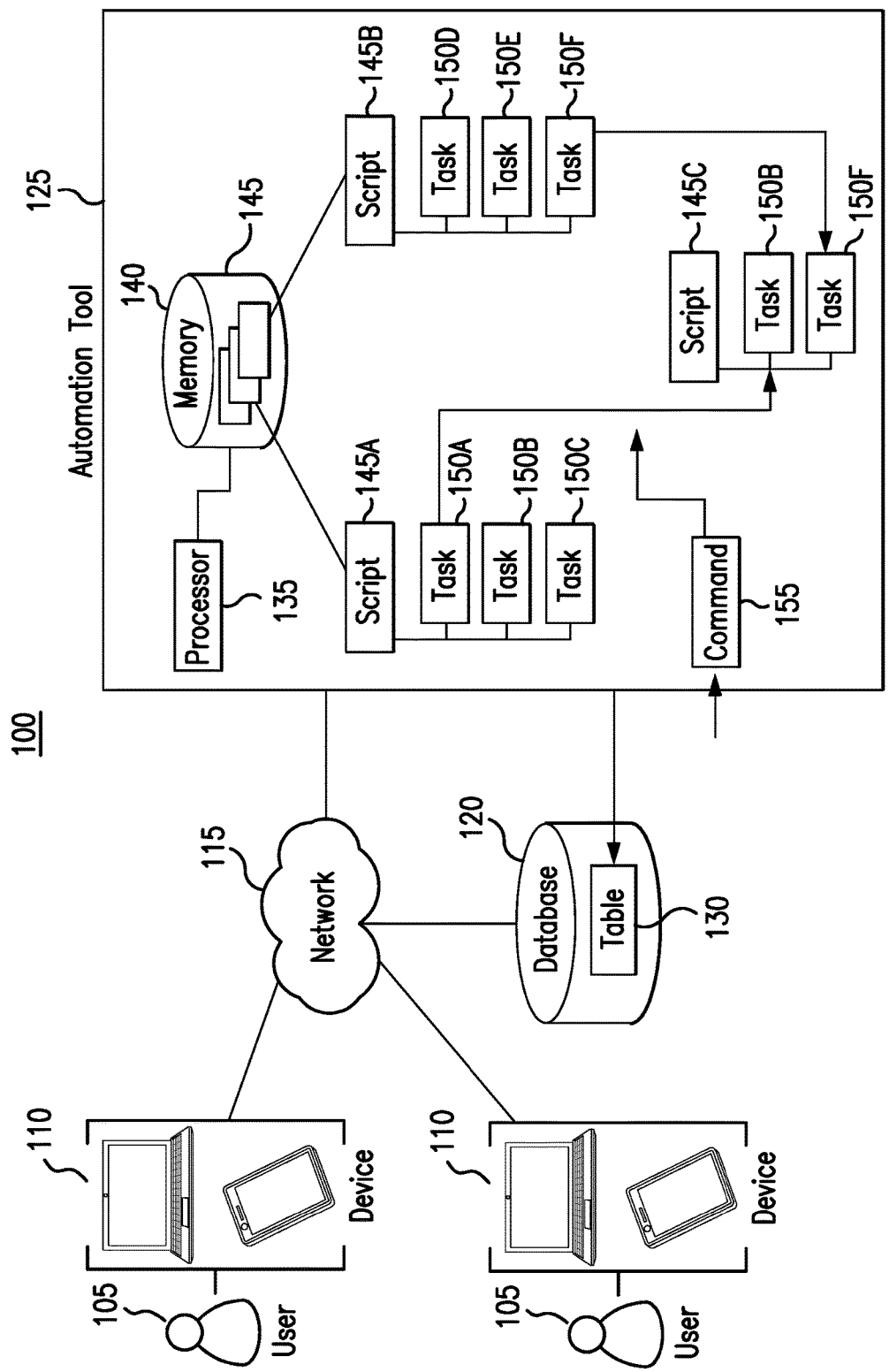
FIG. 1 illustrates an example system.
Figure 2:
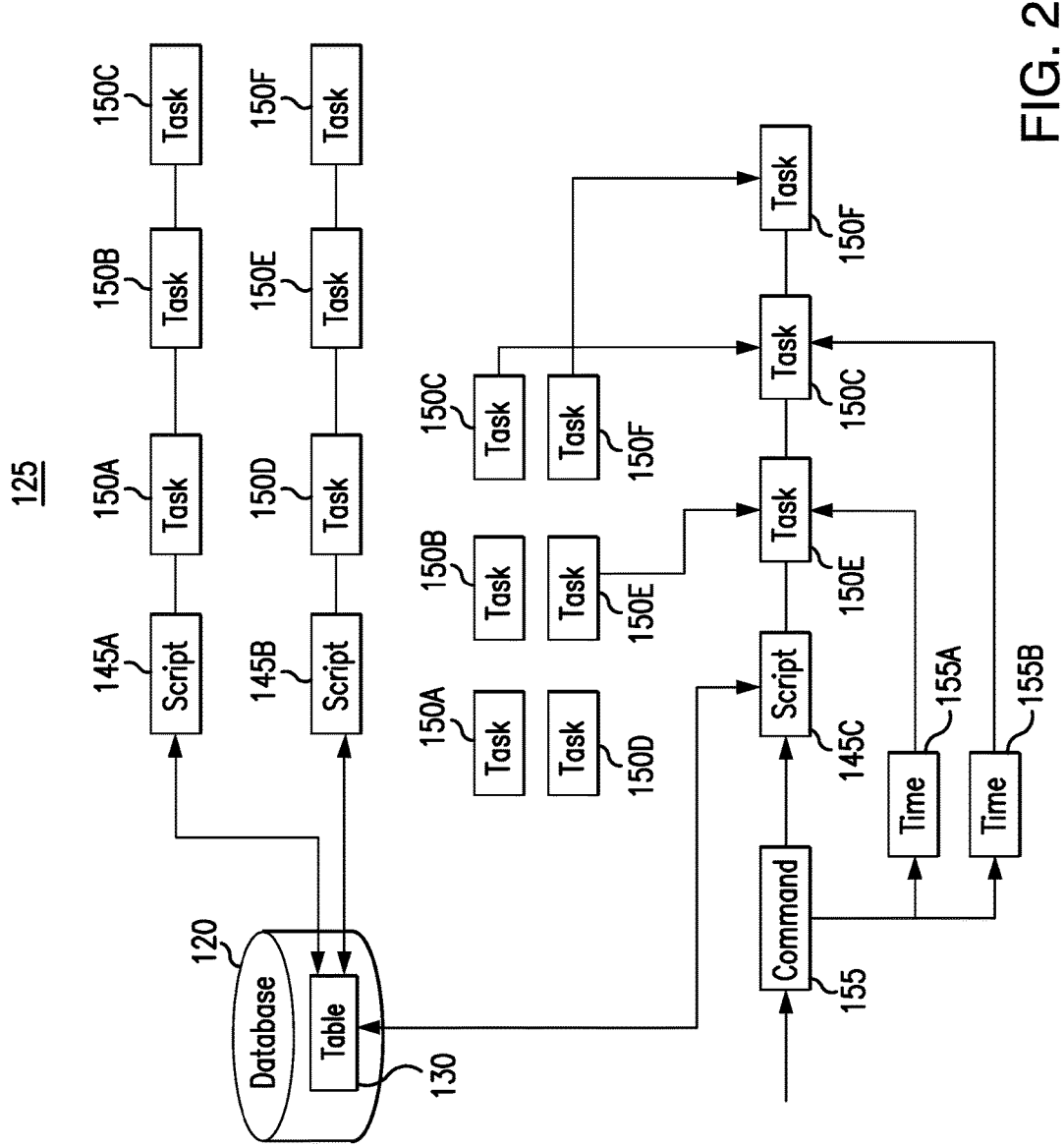
FIG. 2 illustrates an example automation tool of the system of FIG. 1.
Figure 3:
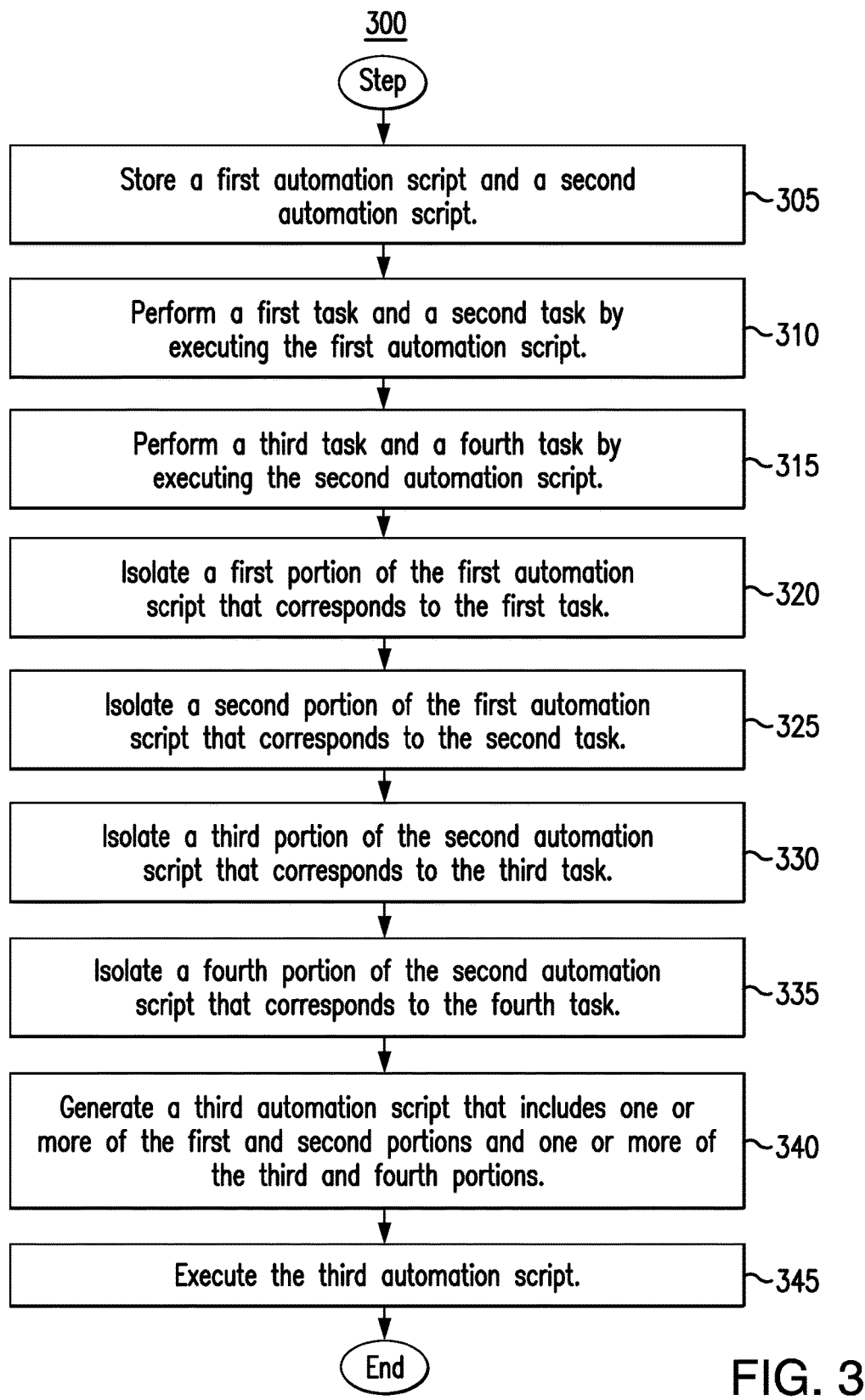
FIG. 3 is a flowchart illustrating a method for improving automation scripts using the system of FIG. 1.

Embodiments of the present disclosure and its advantages are best understood by referring to FIGS. 1 through 3 of the drawings, like numerals being used for like and corresponding parts of the various drawings.

Computers and mobile devices increasingly use automation scripts to automate tasks. For example, these devices may use automation scripts to perform logon and logoff, activating and shutting down a server, pushing and pulling data, perform security and vulnerability scans according to set schedules, etc. In some instances, these scripts can be used to simulate user activity to test the functionality of the device or system. Additionally, these scripts can be used to simulate user activity by a large user base to see how a device or system will perform under stress. Typically, these scripts are used to perform a set of tasks that may be seen as routine according to certain schedules, such as maintenance schedules.

In many instances, these scripts come off-the-shelf and do not allow a user to split or break the script apart. These types of scripts may be referred to as "closed automations" because they do not allow users to peer into the script and isolate and/or separate out the tasks performed by the script. These scripts may be programmed by third parties who do not wish for users to see or analyze the code. As a result, these closed automations pose an all-or-nothing choice to users: either perform all the tasks programmed into a particular script or perform none of them.

This all-or-nothing approach results in significant waste of system resources. For example, suppose a first script performed tasks A, B, C and D and a second script performed tasks B, C, D, and E. If a user wanted to perform tasks A, B, C, D, and E, then the user would need to execute both the first and second scripts, which results in tasks B, C, and D being redundantly performed.

In some instances, this all-or-nothing approach results in certain tasks being not performed. Using the previous example, if a user wanted to perform task A and then task E (e.g., group tasks A and E into a composite task), the user would not be able to execute the first and/or second tasks to achieve this goal because tasks B, C, and D would be performed between tasks A and E.

This disclosure contemplates an unconventional automation tool that breaks apart closed automations into individual tasks. For example, the tool may analyze the coding of scripts and adjust links or tables in files, databases, directories, and/or queues to retarget or relink various tasks in different scripts. In this manner, the tool can separate tasks in automation scripts and adjust and/or reorder tasks. The tool can create composite tasks and new scripts that perform individual tasks in different orders. As a result, the tool reduces system waste by reducing redundant performance of tasks. Additionally, the system allows certain automation scripts to be repurposed even when those automation scripts contain tasks that are not performed. The automation tool will be described in more detail using FIGS. 1 through 3.

FIG. 1 illustrates an example system 100. As shown in FIG. 1, system 100 includes one or more devices 110, a network 115, a database 120, and an automation tool 125. Generally, automation tool 125 can break or separate an automation script into its component tasks. Automation tool 125 can then group and/or rearrange these tasks to form new scripts and/or composite tasks. In certain embodiments, automation tool 125 reduces waste of system resources by reducing the number of redundant task executions. In some embodiments, automation tool 125 improves the usability of automation scripts by repurposing automation scripts that perform undesired tasks.

Device 110 may be any device capable of communicating with one or more of the components of system 100. For example, device 110 may initiate the execution of automation scripts by automation tool 125. As another example, device 110 may instruct automation tool 125 to break a script apart and to group and/or rearrange tasks of a script. In certain embodiments, device 110 may communicate with automation tool 125 through network 115 via a web interface. In some embodiments, device 110 instructs automation tool 125 by issuing commands to automation tool 125.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 stores information used by automation tool 125. For example, database 120 can store one or more tables 130 used by automation tool 125. This disclosure contemplates database 120 storing information arranged in any format. For example, database 120 may store files, directories, and/or queues. The information stored in database 120 may be used to execute various automation scripts. For example, database 120 may store in table 130 information that an automation script uses to determine which tasks to perform at what time, and in what order.

Automation tool 125 creates and executes automation scripts. Generally, automation tool 125 can break automation scripts into component tasks, and group and/or rearrange those tasks to form new automation scripts and/or composite tasks. In this manner, automation tool 125 reduces waste of system resources by reducing the number of redundant task executions in certain embodiments. Automation tool 125, includes processor 135 and memory 140. This disclosure contemplates processor 135 and memory 140 being configured to perform any of the functions of automation tool 125 described herein.

Processor 135 is any electronic circuitry, including, but not limited to microprocessors, application specific integrated circuits (ASIC), application specific instruction set processor (ASIP), and/or state machines, that communicatively couples to memory 140 and controls the operation of automation tool 125. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of automation tool 125 by processing information received from devices 110, network 115, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 135 to perform one or more of the functions described herein.

Automation tool 125 stores scripts 145. These scripts may be referred to as automation scripts. When automation tool 125 executes a script 145, automation tool 125 performs one or more tasks described by the executed script 145. In the illustrated example of FIG. 1, automation tool 125 stores a script 145A and a script 145B. Script 145A describes three tasks 150A, 150B, and 150C. Script 145B described three tasks 150D, 150E, and 150F. When automation tool 125 performs script 145A, automation tool 125 performs tasks 150A, 150B, and 150C. In some embodiments, automation tool 125 performs tasks 150A, 150B, and 150C in that order. When automation tool 125 performs script 145B, automation tool 125 performs tasks 150D, 150E, 150F. In some embodiments, automation tool 125 performs tasks 150D, 150E, 150F in that order. This disclosure contemplates tasks 150 being any suitable task. For example, task 150 may perform log on and log off operations for a server. As another example, task 150 may take a server offline and/or activate the server and bring it back online. As yet another example, task 150 may perform security and/or vulnerability scans on a server.

In some instances, a script 145 is referred to as a closed automation. In these instances, the script 145 may not give a user 105 visibility into the script 145. For example, the script 145 may not allow the user to view, edit, and otherwise manipulate the tasks 150 described by script 145. Using the illustrated example of FIG. 1, if script 145A is a closed automation, then user 105 may not be able to view script 145A to discern tasks 150A, 150B, or 150C. Additionally, user 105 may not rearrange tasks 150A, 150B, and 150C. Furthermore, user 105 may not be able to remove certain of tasks 150A, 150B, or 150C from script 145A. In essence, script 145A, by being a closed automation, presents and all-or-nothing approach to user 105. In other words, if user 105 executes script 145A, then all of tasks 150A, 150B, and 150C are performed in the order defined by script 145A. User 105 does not have the option to remove, for example, task 150B from the execution. Additionally, user 105 cannot reorder the tasks 150 in script 145A.

In some instances, this all-or-nothing approach results in the waste of system resources. For example, if user 105 wishes to perform tasks 150A and 150C, user 105 may run script 145A, but then task 150B will be performed between tasks 150A and 150C. In these instances, task 150B is not needed, or desired to be run, but user 105 may have no choice but to allow task 150B to be performed so that script 145A can be executed. As another example, if user 105 wants tasks 150A, 150E, and 150C to be performed, user 105 may have no choice but to run both scripts 145A and 145B even though this execution results in tasks 150D, 150D, and 150F being performed unnecessarily. As a result of these unneeded tasks 150 being performed, system resources are wasted because they are devoted to performing tasks 150 that are unneeded.

As another example, if tasks 150B and 150E are the same task, and user 105 wants to perform tasks 150A, 150B, and 150F, user 105 may execute both scripts 145A and 145B. This results in the waste of system resources because task 150B will be executed effectively twice: the first time when tasks 150B is executed and the second time when task 150E is executed. This redundant execution of task 150B wastes system resources because system resources are devoted to performing task 150B twice when it only needed to be performed once.

As yet another example, when a script 145 includes many tasks 145 that a user 105 usually does not want to run, user 105 may be discouraged from executing the script 145. Even if the script 145 includes one task 150 that the user 105 wants performed, the user 105 may still be discouraged from executing script 145 because of the significant system resources that would be wasted performing the undesired tasks 150. As a result, script 145 is rarely executed and becomes waste.

As another example, script 145A being a closed automation prevents user 105 from creating composite tasks made up of individual tasks defined by script 145A. For example, if user 105 wants to perform task 150B and 150F, user 105 may have no choice but to execute both script 145A and 145B. It would be more efficient if user 105 could create a script 145 that includes only task 150B and task 150F. User 105 is prevented from doing so because script 145A and script 145B are closed automations.

Automation tool 125 breaks scripts 145 into component tasks 150 and allows the user 105 to group and/or manipulate these tasks 150. For example, user 105 can create new scripts 145 that describe composite tasks and/or induvial tasks 150 from different scripts 145. In this manner, user 105 can use automation tool 125 to break scripts 145 apart so that system resources are not devoted to executing redundant tasks 150 and/or unneeded tasks 150.

Automation tool 125 breaks a script 145 apart into component tasks 150 by isolating portions of the script 145 that are devoted to each task 150. In the illustrated example of FIG. 1, automation tool 125 can isolate portions of script 145A that correspond to tasks 150A, 150B, and 150C. Automation tool 125 can also isolate portions of script 145B that correspond to tasks 150D, 150E, and 150F. Automation tool 125 isolates these portions of the scripts 145 by referencing database 120 and/or table 130 in certain embodiments. For example, automation tool 125 can review information in table 130 to determine the component tasks 150 of a script 145, and to determine the portions of script 145 that correspond to those tasks 150.

After isolating the component tasks 150, automation tool 125 allows user 105 to group and/or rearrange these tasks 150. For example, user 105 can use device 110 to issue a command 155 to automation tool 125. User 105 uses a web interface on device 110 to generate and communicate command 155 to automation tool 125 in certain embodiments. Command 155 may indicate that user 105 wants to group and/or manipulate tasks 150. In the illustrated example of FIG. 1, command 155 instructs automation tool 125 to generate a new script 145C that includes task 150B and 150F. In response automation tool 125 generates script 145C, that includes task 150B and 150F. When automation tool 125 performs or executes script 145C, automation tool 125 performs task 150B and task 150F. This disclosure contemplates automation 125 generating script 145C, using any suitable number of task 150 from any suitable script 145. For example, script 145C may include tasks 150A, 150B, 150D, and 150F in some embodiments.

In certain embodiments, automation tool 125 may generate script 145C by editing table 130. For example, automation tool 125 may change a link for task 150B in table 130 to point to task 150F. As a result, when task 150B is executed, task 150F is subsequently performed after task 150B.

This disclosure contemplates automation tool 125 performing any operation in response to command 155. For example, automation tool 125 may remove a task, such as, for example, task 150C from a script, such as, for example, script 145A. As another example, automation tool 125 may rearrange the tasks within a script. As yet another example, automation tool 125 may add more tasks to script 145. In this manner, automation tool 125 allows the user 105 to group and/or rearrange tasks 150 of a closed automation script 145.

Automation tool 125 may operate on scripts 145 written in any suitable language. Scripts 145 need not be written in the same language. For example, script 145A may be written in a first programming language and script 145B may be written in another programming language. Automation tool 125 is capable of isolating the portions of scripts 145A and 145B that correspond with tasks 150, even though scripts 145A and scripts 145B are written in two different programming languages.

Automation tool 125 tracks the performance or execution of scripts 145 in certain embodiments. For example, if automation tool 125 is executing script 145A, automation tool 125 may track the status of the execution of script 145A. Similarly, automation tool 125 may track the execution of scripts 145B and 145C as they are executing. By tracking the status of the execution of these scripts 145, automation tool 125 can report the status of these executions to user 105.

FIG. 2 illustrates an example automation tool 125 of the system 100 of FIG. 1. As scene in FIG. 2 automation tool 125 executes scripts 145 and can break scripts 145 apart into their component tasks 150. Automation tool 125 can then generate new scripts 145 using the component tasks 150 of other scripts 145. Automation tool 125 can generate these new scripts even though the other scripts 145 on which they are base are closed automations. In this manner, automation tool 125 reduces waste of system resources by reducing the number of redundant executions of tasks 150, in certain embodiments.

Automation tool 125 executes scripts 145. When a script 145 is executed, automation tool 125 preforms one or more tasks 150 described by the executed script 145. In the illustrated example of FIG. 2, automation tool 125 executes scripts 145A and 145B. Script 145A describes tasks 150A, 150B, and 150C. Script 145B describes tasks 150D, 150E, and 150F. Automation tool 125 preforms tasks 150A, 150B, and 150C when script 145A is executed. Automation tool 125 preforms tasks 150D, 150E and 150F when script 145B is executed.

In some instances, scripts 145A and 145B are closed automation scripts. In other words, a user does not have visibility in to the tasks 150 described by scripts 145. Additionally, the scripts 145 prevent the user from adjusting or editing the tasks 150 described by the script 145. As a result, the closed automation scripts 145 present an all-or-nothing approach to the user—either execute all the tasks 150 described by a script 145 or execute none of them. As described above, the all-or-nothing approach results in waste of system resources and other inefficiencies.

Automation tool 125 can break closed automation scripts 145A and 145B into their component tasks 150. In some embodiments, automation tool 125 breaks closed automation scripts by isolating portions of the scripts 145 that correspond to the component tasks 150. Automation tool 125 may reference a table 130 stored in database 120 to determine the portions of a script 145 that correspond to a particular task 150.

After isolating the portions of script 145 that correspond to the component tasks 150 of the script 145, automation tool 125 allows the user to group and or arrange the component tasks 150. A user may use a device to communicate a command 155 to automation tool 125. Command 155 may indicate the groupings and/or arrangements of the component task 150. In the illustrated example of FIG. 2 command 155 indicates that a new script 145C should be generated. Script 145C should include tasks 150E, 150C, and 150F. In response automation tool 125 generates a new script 145C to describe tasks 150E, 150C, and 150F. When automation tool 125 executes script 145C, automation tool 125 will perform tasks 150E, 150C, and 150F.

In this manner, automation tool 125 reduces system waste. For example, if the user were limited to executing only scripts 145A and 145B to preform task 150E, 150C, and 150F, the user would need to preform script 145B and then script 145A. The user would also need to time the execution of scripts 145B and 145A such that tasks 150C is preformed between task 150E and 150F. In many instances, the user will be unable to do so. Additionally, by executing both scripts 145A and 145B, tasks 150A, 150B, 150D are preformed, even though they are not needed. System resources are thus wasted because they are dedicated to preforming these tasks 150 that are both undesired and unnecessary.

By allowing the user to select the tasks 150 to be executed, automation tool 125 reduces waste of system resources and the number of redundant or unneeded executions of task 150.

To generate script 145C, automation tool 125 may edit table 130 in database 120. For example, automation tool 125 may edit pointers in table 130 that correspond to tasks 150E, 150C, and 150F. Automation tool 125 may change the pointer for task 150E to point to task 150C. Automation tool 125 may change to pointer for task 150C to point to task 150F. As a result, when task 150E is preformed, table 130 will indicate that task 150C should be performed next, followed by task 150F.

Automation tool 125 may generate script 145C by combining the portions of script 145A and 145B that corresponds to tasks 150E, 150C, and 150F. In this manner script 145C includes those portions of scripts 145A and 145B.

In certain embodiments command 155 may indicate a schedule or timing for preforming certain tasks. In the illustrated example of FIG. 2, command 155 indicates times 155A and 155B. Command 155 may indicate that 150E should be performed at time 155A and task 150C should be performed at time 155B. In response, automation tool 125 will perform task 150E at time 155A when script 145C is executed. Automation tool 125 may then wait until 155B to preform task 150C followed by task 150F. In this manner, the user is allowed to control the flow and execution of the new script 145C.

FIG. 3 is a flow chart illustrating a method 300 for improving automation scripts using the system 101. In particular embodiments, automation tool 125 preforms method 300. By preforming method 300, automation tool 125 reduces the waste of system resources by reducing the number of redundant and/or unneeded performance of tasks.

Automation tool 125 begins by storing a first automation script and a second automation script in step 305. In certain embodiments, first automation script and second automation scripts are closed automation scripts. In step 310, automation tool 125 preforms a first task and a second task by executing the first automation script. In step 315, automation tool 125 preforms a third task and a fourth task by executing the second automation script.

Automation tool 125 isolates a first portion of the first automation script that corresponds to the first task in step 320. In step 325, automation tool 125 isolates the second portion of the first automation script that corresponds to the second task. Automation tool 125 isolates a third portion of the second automation script that corresponds to the third task in step 330. In step 335, automation tool 125 isolates a fourth portion of the second automation script that corresponds to the fourth task.

Automation tool 125 generates a third automation script that includes one or more of the first and second portions and one or more of the third or fourth portions in step 340. In this manner, the third automation script is able to perform a task from both the first and second automation scripts even though they are closed automation scripts. In step 345, automation tool 125 executes the third automation script. By executing the third automation script task from both the first automation script are performed.

Modifications, additions, or omissions may be made to method 300 depicted in FIG. 3. Method 300 may include more, fewer, or other steps. For example, steps may be performed in parallel or in any suitable order. While discussed as automation tool 125 (or components thereof) performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory configured to store a first automation script and a second automation script; and
   a hardware processor communicatively coupled to the memory, the hardware processor configured to:
      perform a first task and a second task by executing the first automation script;
      perform a third task and a fourth task by executing the second automation script;
      isolate a first portion of the first automation script that corresponds to the first task;
      isolate a second portion of the first automation script that corresponds to the second task;
      isolate a third portion of the second automation script that corresponds to the third task;
      isolate a fourth portion of the second automation script that corresponds to the fourth task;
      generate a third automation script that includes one or more of the first portion and the second portion and one or more of the third portion and the fourth portion; and
      execute the third automation script to perform one or more of the first task and the second task and one or more of the third task and fourth task;
   wherein:
   the first task is to log out all users from a server;
   the second task is to perform a vulnerability scan on the server;
   the third task is to activate the server; and
   the fourth task to allow users to login to the server.

2. The apparatus of claim 1, wherein the first automation script and the second automation script are written in two different programming languages.

3. The apparatus of claim 1, wherein:
   the hardware processor is further configured to receive, through a web interface, a command to generate the third automation script; and
   generating the third automation script is performed in response to the command.

4. The apparatus of claim 1, wherein the hardware processor is further configured to track a status of execution of the first automation script, the second automation script, and the third automation script.

5. The apparatus of claim 1, wherein generating the third automation task comprises editing a table of a database to direct one or more of the first portion and the second portion to one or more of the third portion and the fourth portion.

6. The apparatus of claim 1, wherein:
the hardware processor is further configured to receive a first time and a second time; and
executing the third automation script comprises performing one or more of the first task and the second task at the first time and one or more of the third task and the fourth task at the second time.

7. A method comprising:
storing, by a memory, a first automation script and a second automation script; and
performing, by a hardware processor communicatively coupled to the memory, a first task and a second task by executing the first automation script;
performing, by the hardware processor, a third task and a fourth task by executing the second automation script;
isolating, by the hardware processor, a first portion of the first automation script that corresponds to the first task;
isolating, by the hardware processor, a second portion of the first automation script that corresponds to the second task;
isolating, by the hardware processor, a third portion of the second automation script that corresponds to the third task;
isolating, by the hardware processor, a fourth portion of the second automation script that corresponds to the fourth task;
generating, by the hardware processor, a third automation script that includes one or more of the first portion and the second portion and one or more of the third portion and the fourth portion; and
executing, by the hardware processor, the third automation script to perform one or more of the first task and the second task and one or more of the third task and fourth task;
wherein:
the first task is to log out all users from a server;
the second task is to perform a vulnerability scan on the server;
the third task is to activate the server; and
the fourth task to allow users to login to the server.

8. The method of claim 7, wherein the first automation script and the second automation script are written in two different programming languages.

9. The method of claim 7, further comprising receiving, by the hardware processor, through a web interface, a command to generate the third automation script, wherein generating the third automation script is performed in response to the command.

10. The method of claim 7, further comprising tracking, by the hardware processor, a status of execution of the first automation script, the second automation script, and the third automation script.

11. The method of claim 7, wherein generating the third automation task comprises editing a table of a database to direct one or more of the first portion and the second portion to one or more of the third portion and the fourth portion.

12. The method of claim 7, further comprising receiving, by the hardware processor, a first time and a second time, wherein executing the third automation script comprises performing one or more of the first task and the second task at the first time and one or more of the third task and the fourth task at the second time.

13. A system comprising:
a database; and
an automation tool implemented by a hardware processor and configured to:
store a first automation script and a second automation script; and
perform a first task and a second task by executing the first automation script, the first task linked to the second task in the database;
perform a third task and a fourth task by executing the second automation script, the third task and the fourth task linked in the database;
isolate a first portion of the first automation script that corresponds to the first task;
isolate a second portion of the first automation script that corresponds to the second task;
isolate a third portion of the second automation script that corresponds to the third task;
isolate a fourth portion of the second automation script that corresponds to the fourth task;
generate a third automation script that includes one or more of the first portion and the second portion and one or more of the third portion and the fourth portion; and
execute the third automation script to perform one or more of the first task and the second task and one or more of the third task and fourth task;
wherein:
the first task is to log out all users from a server;
the second task is to perform a vulnerability scan on the server;
the third task is to activate the server; and
the fourth task to allow users to login to the server.

14. The system of claim 13, wherein the first automation script and the second automation script are written in two different programming languages.

15. The system of claim 13, wherein:
the automation tool is further configured to receive, through a web interface, a command to generate the third automation script; and
generating the third automation script is performed in response to the command.

16. The system of claim 13, wherein generating the third automation task comprises editing a table of the database to direct one or more of the first portion and the second portion to one or more of the third portion and the fourth portion.

17. The system of claim 13, wherein:
the automation tool is further configured to receive a first time and a second time; and
executing the third automation script comprises performing one or more of the first task and the second task at the first time and one or more of the third task and the fourth task at the second time.

* * * * *